US006321301B1

(12) United States Patent
Lin et al.

(10) Patent No.: US 6,321,301 B1
(45) Date of Patent: Nov. 20, 2001

(54) CACHE MEMORY DEVICE WITH PREFETCH FUNCTION AND METHOD FOR ASYNCHRONOUSLY RENEWING TAG ADDRESSES AND DATA DURING CACHE MISS STATES

(75) Inventors: Ming-Fen Lin, Taipei; Chung-Ching Chen, Taichung; Ming-Tsan Kao, Kaohsiung, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/372,922

(22) Filed: Aug. 12, 1999

(30) Foreign Application Priority Data

May 6, 1999 (TW) ................................................ 88107334

(51) Int. Cl.⁷ ..................................................... G06F 12/08
(52) U.S. Cl. ........................................... 711/137; 711/145
(58) Field of Search ..................................... 711/137, 133, 711/128, 118, 3, 141, 144, 145, 156, 159, 204, 213

(56) References Cited

U.S. PATENT DOCUMENTS

| | | | |
|---|---|---|---|
| 5,535,350 | * | 7/1996 | Maemura ............................. 711/137 |
| 5,634,104 | * | 5/1997 | Maki ..................................... 711/137 |
| 5,778,436 | * | 7/1998 | Kedem et al. ....................... 711/137 |
| 6,078,993 | * | 6/2000 | Iwata et al. .......................... 711/128 |
| 6,119,221 | * | 9/2000 | Zaiki et al. ........................... 712/237 |
| 6,173,365 | * | 1/2001 | Chang .................................. 711/118 |
| 6,240,488 | * | 5/2001 | Mowry ................................. 711/128 |

* cited by examiner

Primary Examiner—Matthew Kim
Assistant Examiner—Pierre-Michel Bataille
(74) Attorney, Agent, or Firm—Jiawei Huang; J.C. Patents

(57) ABSTRACT

A cache device and a method of using the same for data accesses according to the invention. Particularly, the cache device has a prefetch queue comparing circuit which comprises a cache hit/miss judging circuit, an address queue register and a prefetch condition judging circuit. The cache hit/miss judging circuit is used to judge whether a currently-read address coming from a bus is of cache hit or cache miss, wherein the address consists of an index address and a tag address. The address queue register directly stores the index address of the currently-read address plus a corresponding first one-bit flag signal if the cache hit/miss judging circuit judges that the currently-read address is of cache hit. The prefetch condition judging circuit is used to judge whether the index address of the currently-read address is the same as any index addresses already stored in the address queue register if the cache hit/miss judging circuit judges that the currently-read address is of cache miss. If the index address is not the same as any index address still stored in the address queue register, a corresponding tag address and data originally stored in a tag memory and a data memory, respectively are renewed in an asynchronous way.

6 Claims, 5 Drawing Sheets

US 6,321,301 B1

CACHE MEMORY DEVICE WITH PREFETCH FUNCTION AND METHOD FOR ASYNCHRONOUSLY RENEWING TAG ADDRESSES AND DATA DURING CACHE MISS STATES

CROSS-REFERENCE TO RELATED APPLICATION

This application claims the priority benefit of Taiwan application Ser. No. 88107334, filed May 6, 1999, the full disclosure of which is incorporated herein by reference.

BACKGROUND OF THE INVENTION

1. Field of the Invention

The invention relates to a cache device and a method of using the same for data accesses, and in particular to a cache device having an improved efficiency by prefetching and storing address data using a prefetch queue comparing circuit.

2. Background of the Related Art

Computers which are widely used in line with a great progress in semiconductor technology have brought a great change into out life for dozens of years. Now, some companies have successfully produced central processing units (CPUs) with an operating clock of several hundred MHz. Unfortunately, not all devices, such as memory devices, included in a computer system can operate with an operating clock the same as that of CPUs. Although the frequency of the operating clock of CPUs is continuously increased, the access speed of dynamic random access memories (hereinafter referred to as DRAMs) is not greatly improved. To resolve this problem, a cache device is introduced. That is, in a computer system, DRAMs serve a primary memory while static random access memories (SRAMs) serve as a cache device. With such a cache device, data to be likely requested by a CPU is previously transferred from the primary memory to the cache device. In this case, the CPU can access the higher-speed cache device directly instead of the primary memory, thereby reducing data access time. Therefore, a better balance between costs and efficiency can be reached. However, since the cache device has a data memory capacity smaller than that of the primary memory, data required by the CPU may not be totally stored in the cache memory. If data requested by the CPU are exactly stored in the cache memory, this state is called "cache hit" and can allow the data to be accessed with less time taken by the CPU. Inversely, if data requested by the CPU are not stored in the cache memory, this state is called "cache miss." At the "cache miss" state, the CPU has to access the required data through the primary memory with more time taken. The ratio of the "cache hit" and "cache miss" indicates "hit ratio."

Referring to FIG. 1, a conventional cache device according to the prior art is shown. In FIG. 1, a cache device 100 mainly consists of a cache memory 110 and a cache control circuit 120. The cache control circuit 120 is responsible for the entire operation of the cache device 100 by controlling the cache memory 110. The cache memory 110 includes a data RAM 112 and a tag RAM 114. The data RAM 112 stores data corresponding to the primary memory 140 while the tag RAM 114 stores tag addresses corresponding to the data stored.

For detailed description, FIG. 2A illustrates the corresponding relationship between the cache memory 110 and the primary memory 140. As shown in FIG. 2A, the primary memory 140 is divided into several blocks each given with a distinct tag address. Furthermore, the index addresses of each block are the same as those of the tag memory 114 and the cache memory 110, wherein each index address is corresponding to a tag address stored in the tag memory 114 and data stored in the data memory 112 at the same time. Referring to FIG. 2B, the combination of a tag address and an index address represents a corresponding addresses of the primary memory 140. In other words data stored at an index address of the data memory 112 with a corresponding tag address stored in the tag memory 114 is identical to that stored at the same address (consisting of the tag address and the index address) of the primary memory 140. As we know, the cache memory 110 only stores part of data of the primary memory 140. Therefore, it must be determined that whether it is at a "cache hit" state or a "cache miss" state and whether it is necessary to re-transfer required data of the primary memory 140 into the cache memory 110 when the cache device 100 handles with data accesses requested from the CPU. The way to achieve the above-stated determination is that when a data access request is received from the CPU, an address output from the CPU is compared to all tag addresses stored in the tag memory 114 together with corresponding index addresses. If the comparing result shows that one is matched, it represents a "cache hit" state while if no one is matched, it represents a "cache miss" state.

Assume that reference symbol $T_{WR}$ designates data access time of the cache memory 110, $T_{MEM}$ designates data access time of the primary memory 140 and $R_{HIT}$ designates cache hit ratio of the cache device 100. The average data access time $T_{AV}$ can be expressed by:

$$T_{AV}=R_{HIT}(T_{WR})+(1-R_{HIT})(T_{WR}+T_{MEM}) \quad (1)$$

In equation (1), $(T_{WR}+T_{MEM})$ represents the required access time when the cache device 100 is experienced "cache miss", wherein $T_{MEM}$ is generally much longer than $T_{WR}$. In other words, the required data access time at a "cache miss" state is much longer, resulting in a poor system efficiency.

SUMMARY OF THE INVENTION

In view of the above, the invention provides a cache device. The cache device electrically coupled to a primary memory through a bus, includes a data memory, a tag memory, a cache control circuit, wherein the cache control circuit has a prefetch queue comparing circuit. The data memory is for storing data at corresponding index addresses while the tag memory is for storing tag addresses at the corresponding index addresses. The prefetch queue comparing circuit includes a cache hit/miss judging circuit, an address queue register and a prefetch condition judging circuit. The cache hit/miss judging circuit is used to judge whether a currently-read address coming from the bus is of cache hit or cache miss, wherein the address consists of an index address and a tag address. The address queue register directly stores the index address of the currently-read address plus a corresponding first one-bit flag signal output from the cache hit/miss judging circuit if the cache hit/miss judging circuit judges that the currently-read address is of cache hit, wherein the address queue register always continuously outputs index addresses already stored therein in first in-first out order to the data memory for data accesses. The prefetch condition judging circuit is used to judge whether the index address of the currently-read address is the same as any index addresses already stored in the address queue register if the cache hit/miss judging circuit judges that the currently-read address is of cache miss. When the index address is not the same as any index addresses still stored in the address queue register, an original tag address stored at the same index address in the tag memory is replaced with the tag address of the currently-read address with the control of the cache control circuit, and then the index address plus a corresponding second one-bit flag signal output from the cache hit/miss judging circuit are stored in the address queue register. According to the second one-bit flag signal, original data stored at the same index address in the data memory are replaced with required data stored at the same currently-read address in the primary memory, and then the second one-bit flag signal is changed into the first one-bit flag signal with the control of the cache control circuit.

Furthermore the invention provides a method of using the cache device for data accesses according to the invention. The method includes the following steps. First, whether a currently-read address coming from the bus is of cache hit or cache miss is judged by the cache hit/miss judging circuit, wherein the address consists of an index address and a tag address. The index address of the currently-read address plus a corresponding first one-bit flag signal output from the cache hit/miss judging circuit is directly stored in the address queue register if the cache hit/miss judging circuit judges that the currently-read address is of cache hit, wherein the address queue register always continuously outputs index addresses already stored therein in first in-first out order to the data memory for data accesses. Whether the index address of the currently-read address is the same as any index addresses already stored in the address queue register is judged by the prefetch condition judging circuit if the cache hit/miss judging circuit judges that the currently-read address is of cache miss. An original tag address stored at the same index address in the tag memory is replaced with the tag address of the currently-read address when the index address is not the same as any index addresses still stored in the address queue register. The index address plus a corresponding second one-bit flag signal output from the cache hit/miss judging circuit are stored in the address queue register after the previous step. After that, original data stored at the same index address in the data memory are replaced with required data stored at the same currently-read address in the primary memory. Subsequently, the second one-bit flag signal is changed into the first one-bit flag signal.

Accordingly, a first advantage of the invention is that it can be previously determined whether an index address included in a currently-read address coming from a bus is of "cache hit" or "cache miss." Since a cache miss address can be previously detected with such a prefetch function, corresponding tag address and data originally stored in the tag memory and the data memory of a cache device can be renewed in advance.

A second advantage of the invention is that a tag address and data stored in the tag memory and the data memory, respectively are renewed in an asynchronous way. Therefore, data access time for a cache miss can be minimized.

A third advantage of the invention is that using a simple comparator, no required data already stored in the data memory will be unintentionally renewed during a cache miss state.

BRIEF DESCRIPTION OF THE DRAWINGS

The invention will be more fully understood from the detailed description given hereinbelow and the accompanying drawings, which are given by way of illustration only, and thus do not limit the present invention, and wherein.

DETAILED DESCRIPTION OF THE PREFERRED EMBODIMENT

Figure 1:
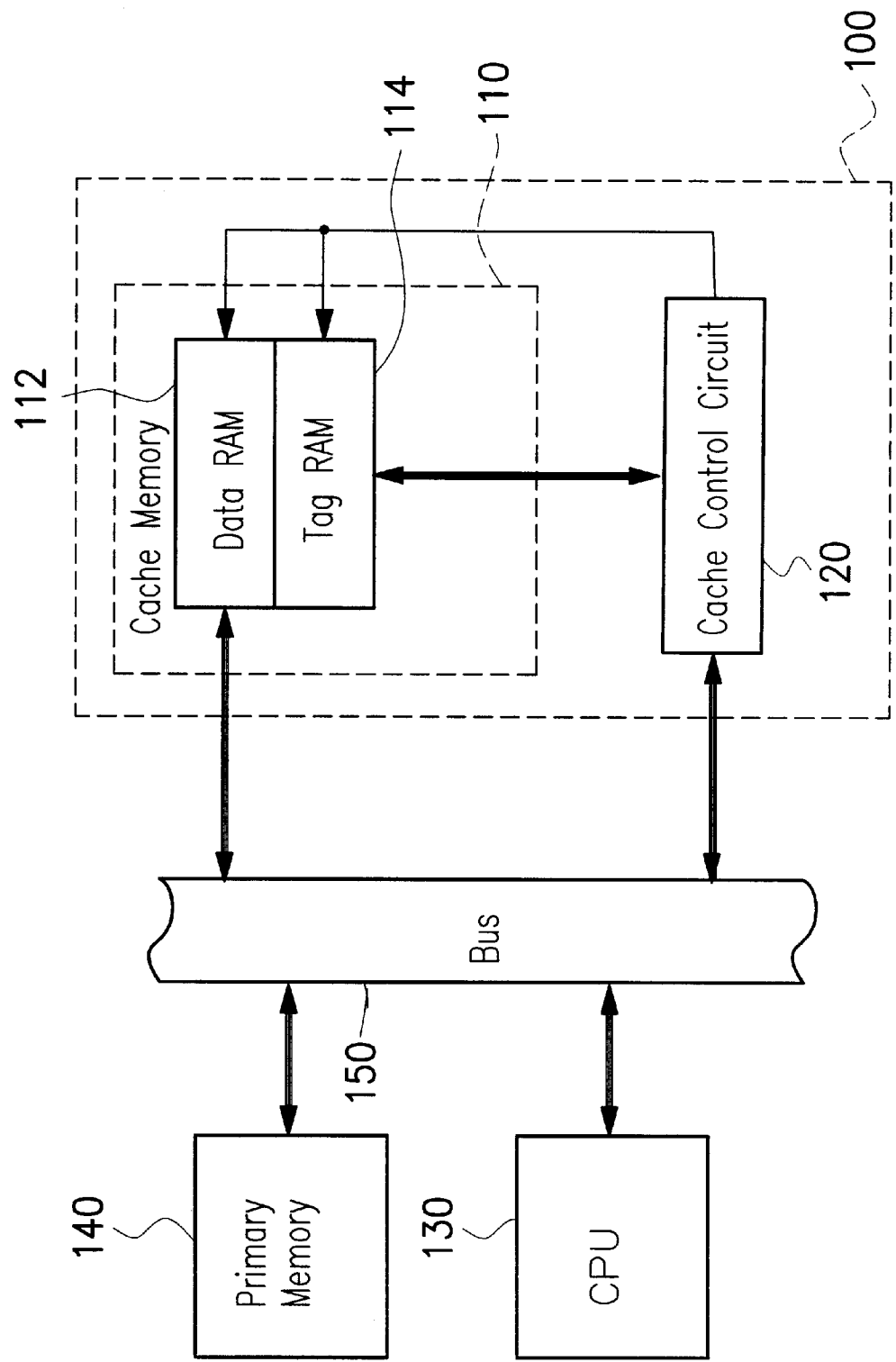
FIG. 1 is a block diagram showing a cache device according to the prior art.
Figure 2A:
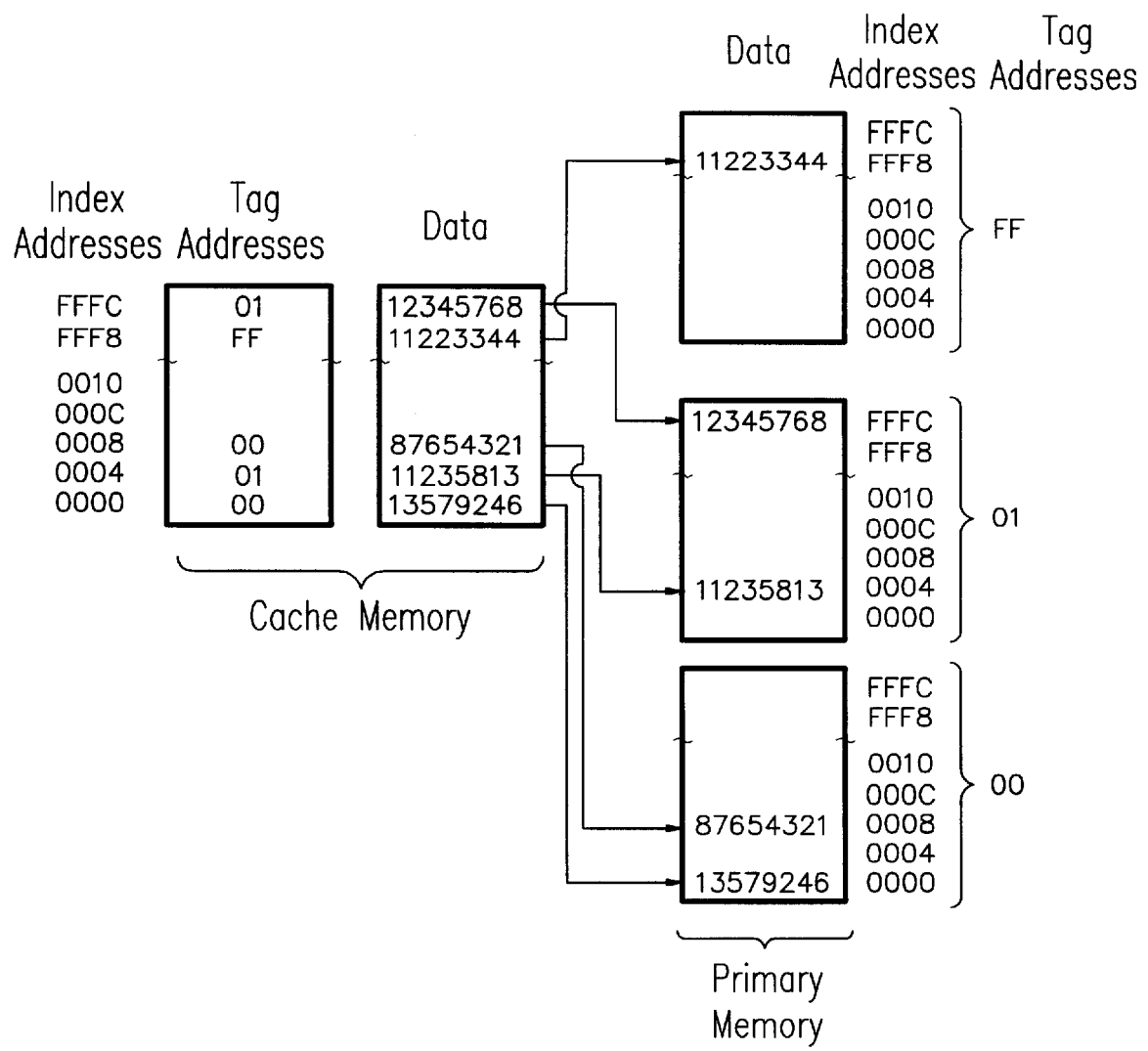
FIG. 2A shows the corresponding relationship between a cache memory and a primary memory.
Figure 2B:
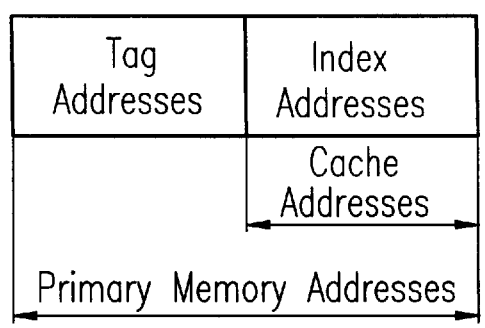
FIG. 2B shows the combination of tag and index address data of the primary memory.
Figure 3:
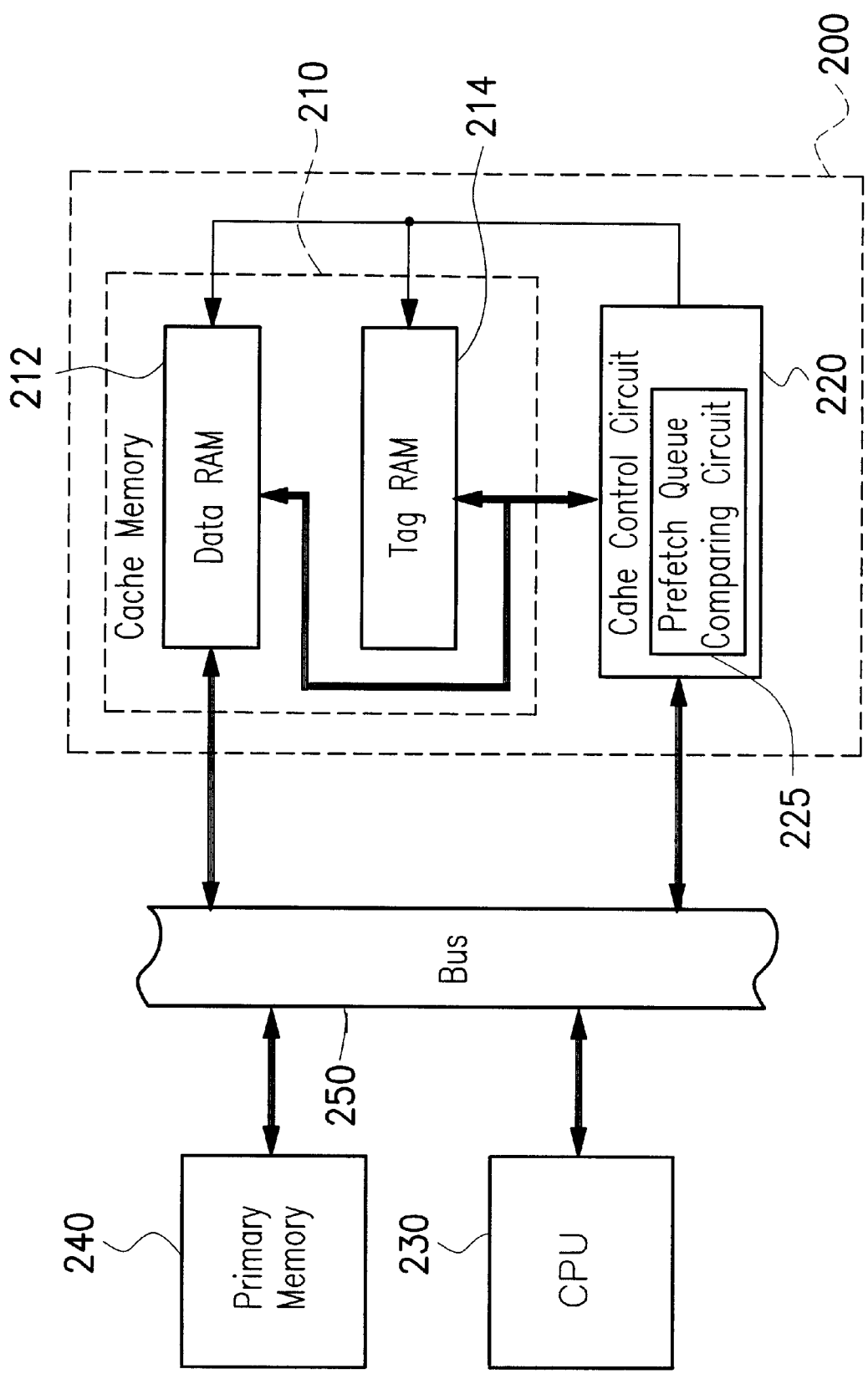
FIG. 3 is a block diagram showing a cache device according to the invention.

Referring to FIG. 3, a cache device 200 according to the invention is shown. Substantially, the cache device 200 includes a cache memory 210 having a data memory 212 and a tag memory 214 and a cache control circuit 220 having a prefetch queue comparing circuit 225. The operation relating to the cache device 200 with the prefetch queue comparing circuit 225 shown in detail in FIG. 4 will be further described in the following.

Figure 4:
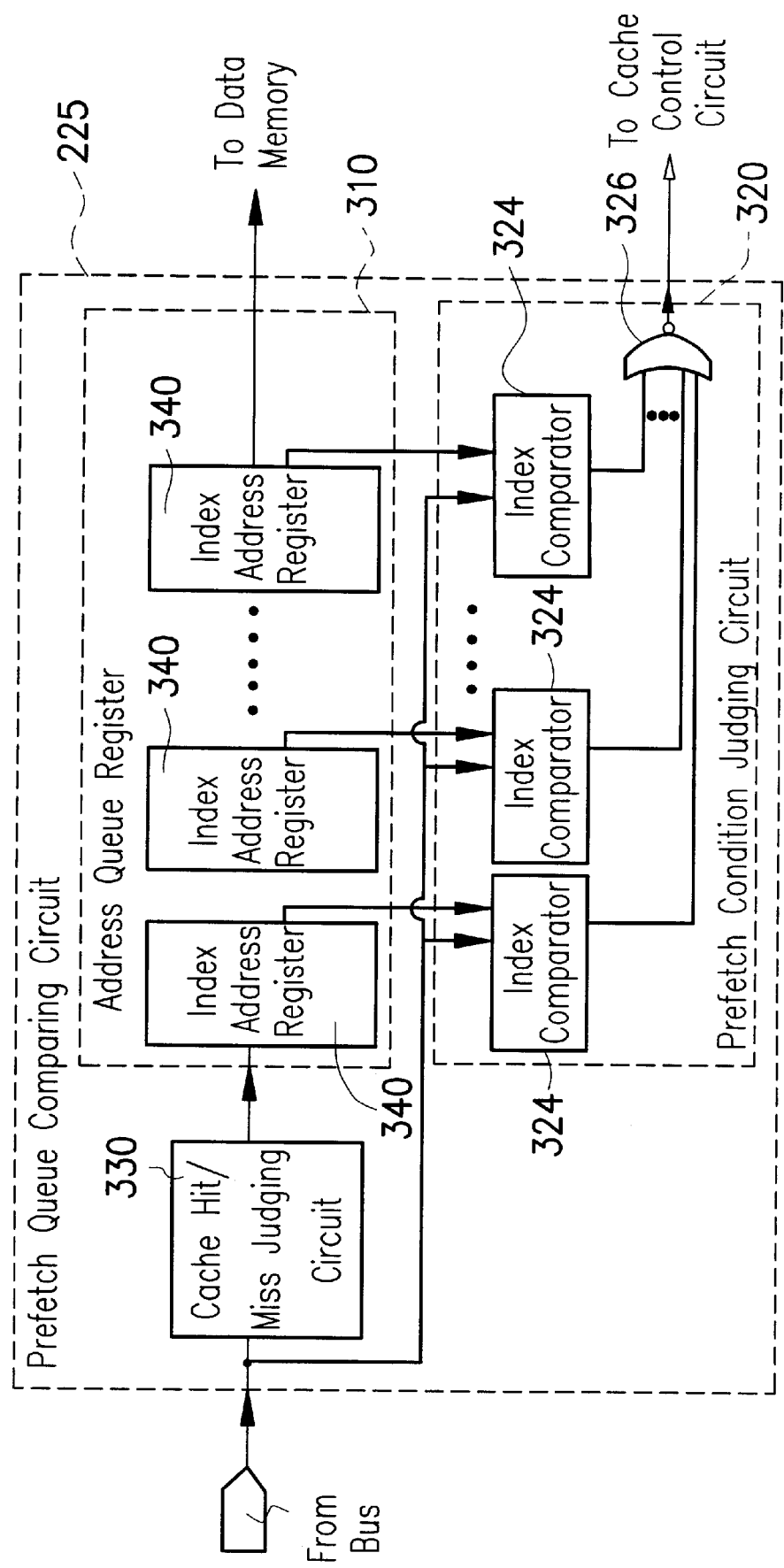
FIG. 4 is a block diagram showing a prefetch queue comparing circuit of FIG. 3 according to the invention.

Referring to FIG. 4 together with FIG. 3, the prefetch queue comparing circuit 225 which includes a cache hit/miss judging circuit 330, an address queue register 310 and a prefetch condition judging circuit 320, reads required addresses from a CPU 230 through a Bus 250 in sequence, wherein each address coming from the CPU 230 is divided into a tag address and an index address. The cache hit/miss judging circuit 330 is used to judge whether a currently-read address from the bus 250 is of "cache hit"or "cache miss." If the cache hit/miss judging circuit 330 judges that the currently read address is of "cache hit," an index address included in the currently-read cache hit address plus a first one-bit flag signal, for example, with a high logic level representing a "cache hit" state, directly output from the cache hit/miss judging circuit 330 are stored in a corresponding index address register 340 of the address queue register 310. Furthermore, the address queue register 310 always continuously outputs index address already stored therein in first in-first out order to the data memory 212 for data accesses.

Inversely, if the cache hit/miss judging circuit 330 judges that the currently-read address is of "cache miss," a prefetch condition judging circuit 320 is used to previously compare the index address included in the currently-read cache miss address to all index addresses already stored in the address queue register 310 with a plurality of index comparators 324.

If the index address of the currently-read cache miss address is completely the same as any one index address still stored in the address queue register 310, the index address of the currently-read cache miss address is temporarily held outside the address queue register 310. At this time, each index address already stored in the address queue register 310 continues to shift toward the output end of the address queue register 310 in order, thereby outputting the already-stored index addresses from the address queue register 310. Until the already-stored index address identical to the held index address is output from the address queue register 310, the index address included in the currently-read cache miss address is still held.

That is, when the held index address included in the currently-read address is not the same as any index addresses still stored in the address queue register 310, an NOR gate 326 in the prefetch condition judging circuit 320 outputs a changeable signal to enable the cache control circuit 220 to output a tag control signal to the tag memory 214. According to the tag control signal, an original tag address stored at one index address in the tag, memory 214, identical to the held index address, is replaced with a tag address included in the currently-read cache miss address. After that, the held index address plus a second one-bit flag signal , for example, with a low logic level representing a "cache miss" state, output from the cache hit/miss judging circuit 330 are stored in a corresponding index address register 340 of the address queue register 310.

Later, the cache control circuit 220 outputs a data control signal to the data memory 212 based on the second one-bit flag signal with a low logic level, so that original data stored at the index address in the data memory 212, identical to the just input index address, is replaced with required data stored in the address (the same as the currently-read address) of the primary memory 240. Thereafter, the second one-bit flag signal with a low logic level is changed into the first one-bit flag signal with a low logic level which indicates that the currently-read address has turned to a "cache hit" state. With such a comparison, no required data previously stored at the index address of the data memory 212 the same as that of the currently-read address will be unintentionally renewed.

As described above, the main difference from the prior art is that the prefetch queue comparing circuit 225 is additionally included in the cache control circuit 220. Moreover, with a tag memory 214 and a data memory 212 separated from each other, tag addresses and corresponding data stored therein, respectively can be renewed in a asynchronous way if necessary. Therefore, the data access time at a cache miss state can be minimized.

Figure 5:
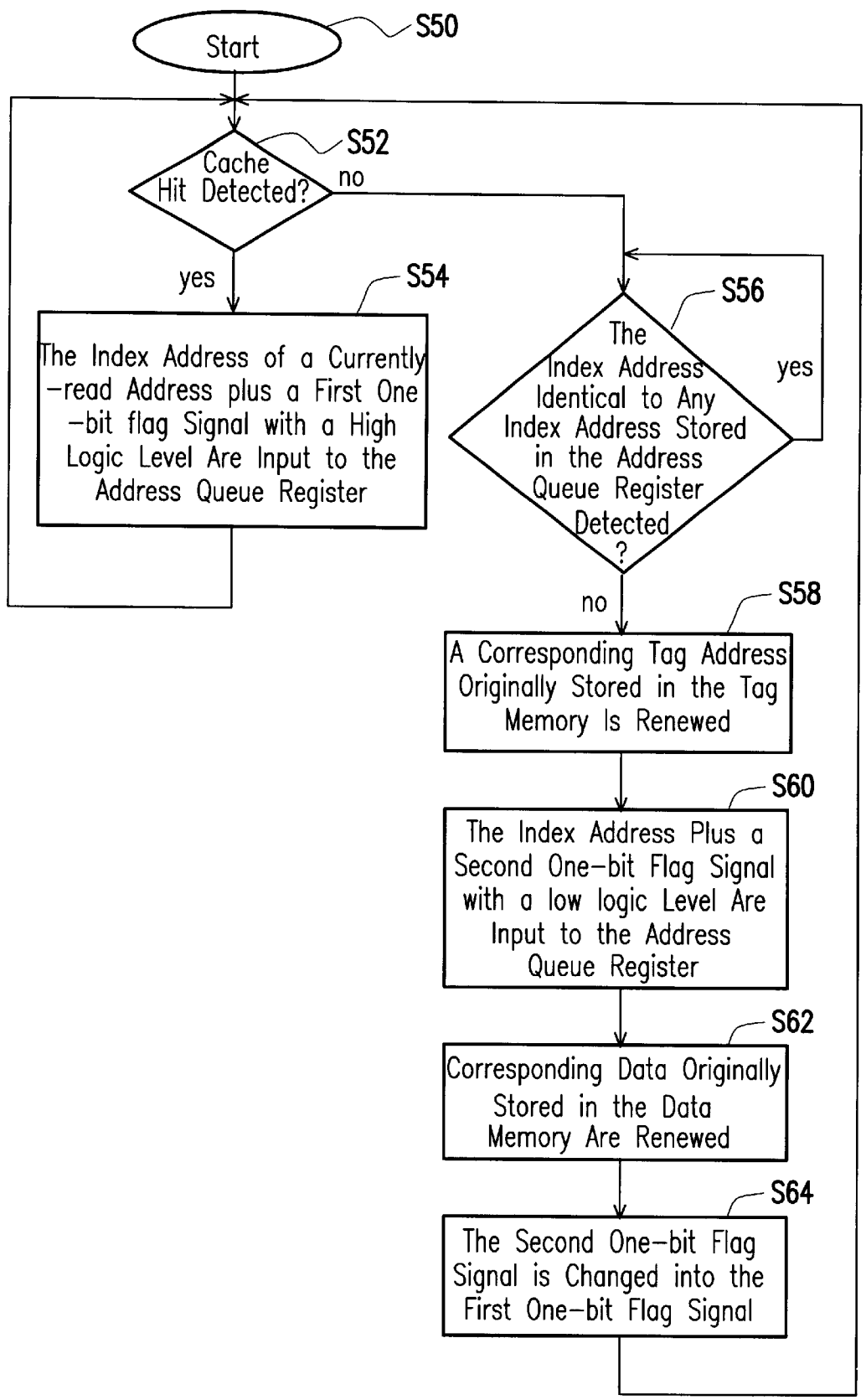
FIG. 5 is a flow chart showing a method of using a cache device for data accesses according to the invention.

FIG. 5 is a flow chart showing a method of using a cache device for data accesses according to the invention. For clear description of the method of using a cache device for data accesses, please refer to FIG. 5 together with FIGS. 3 and 4. The processing starts at step 50 (S50). Then, step 52 is performed to determine whether a currently read address coming from a bus 250 is of "cache hit" or "cache miss" by the cache hit/miss judging circuit 330. If detecting that the currently-read address is of "cache hit," an index address included in the currently-read address plus a first one-bit flag signal, for example, with a high logic level indicating a "cache hit" state, output from the cache hit/miss judging circuit 330 are stored in a corresponding index address register 340 of the address queue register 310 in step 54 (S54), wherein the address queue register 310 always continuously outputs index address already stored therein in first in-first out order to the data memory 212 for data accesses. Inversely, if detecting that the currently-read address is of "cache miss," the processing proceeds with step 56 (S56) to determine whether the index address is the same as any index addresses already stored in the index address registers 340 of the address queue register 310. If yes, the processing goes to step 56 again while if not, step 58 (S58) is performed to replace an original tag address stored at one index address in the tag memory 214, identical to the held index address, with a tag address included in the currently-read cache miss address. Next, to perform step 60 (S60), in which an index address included in the currently-read address plus a second one-bit flag signal, for example, with a low logic level indicating a "cache miss" state, output from the cache hit/miss judging circuit 330 are stored in a corresponding index address register 340 of the address queue register 310. Thereafter, step 62 (S62) is performed to replace original data stored at the index address in the data memory, identical to the just-input index address, with required data stored at the address (the same as the currently-read address) in the primary memory 240. Subsequently, the second one-bit flag signal with a low logic level is changed into the first one-bit flag signal with a high logic level which indicates that the currently-read address is turned into a "cache hit" state in step 64 (S64).

Using a 3D graphic system texture cache device, the difference between the invention and the prior art can be evidently seen.

For example, in a 3D graphic system texture cache device which has a cache size of 4k bytes, a cache line size of 64 bytes and 32 cache lines for each cache set and needs 150,000 times of data accesses for each frame, the hit ratio is 98.60%. Therefore, the number of cache hit data=150,000×98.6%=147,900; and the number of cache miss data=150,000−149,000=2,100.

For a cache hit, one clock is needed to complete a data access while for a cache miss, 12 clocks are needed to complete a data access. However, in the invention with a prefetch function, only 4 clocks are needed to complete a data access for a cache miss.

A frame access in the prior art requires:

$1_{(clock)} \times 147,900 + 12_{(clock)} \times 2,100 = 173,100_{(clock)}$

A frame access in the invention with a prefetch function requires:

$1_{clock} \times 147900 + 4_{(clock)} \times (2100 \times 78.12\%) + 12_{(clock)} \times (2100 \times 21.88\%) = 159976 = 159976_{(clock)}$ As can be obviously seen from the above, the data access time has been greatly reduced by:

(173,100−159,976)/173100=7.58%

In summary, a first advantage of the invention is that it can be previously determined whether an index address included in a currently-read address coming from a bus is of "cache hit" or "cache miss." Since a cache miss address can be previously detected with such a prefetch function, corresponding tag address and data originally stored in the tag memory and the data memory of a cache device can be renewed in advance.

A second advantage of the invention is that a tag address and data stored in the tag memory and the data memory, respectively are renewed in an asynchronous way. Therefore, data access time for a cache miss can be minimized.

A third advantage of the invention is that using a simple comparator, no required data already stored in the data memory will be unintentionally renewed during a cache miss state.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A cache device, electrically coupled to a primary memory through a bus, comprising:

a data memory for storing data at corresponding index addresses;

a tag memory for storing tag addresses at the corresponding index addresses; and a cache control circuit having a prefetch queue comparing circuit which comprises:

a cache hit/miss judging circuit for judging whether a currently-read address coming from the bus is of cache hit or cache miss, wherein the address consists of an index address and a tag address;

an address queue register for directly storing the index address of the currently-read address plus a corresponding first one-bit flag signal output from the cache hit/miss judging circuit if the cache hit/miss judging circuit judges that the currently-read address is of cache hit, wherein the address queue register always continuously outputs index addresses already stored therein in first in-first out order to the data memory for data accesses; and a prefetch condition judging circuit for judging whether the index address of the currently-read address is the same as any index addresses already stored in the address queue register if the cache hit/miss judging circuit judges that the currently-read address is of cache miss;

wherein an original tag address stored at the same index address in the tag memory is replaced with the tag address of the currently-read address with the control of the cache control circuit, and then the index address plus a corresponding second one-bit flag signal output from the cache hit/miss judging circuit are stored in the address queue register when the index address is not the same as any index addresses still stored in the address queue register, and according to the second one-bit flag signal, original data stored at the same index address in the data memory are replaced with required data stored at the same currently-read address in the primary memory, and then the second one-bit flag signal is changed into the first one-bit flag signal with the control of the cache control circuit.

2. The cache device as defined in claim 1, wherein the first one-bit flag signal is at a high logic level.

3. The cache device as defined in claim 2, wherein the second one-bit flag signal is at a low logic level.

4. A method of using a cache device for data accesses, wherein the cache device electrically coupled to a primary memory through a bus includes a data memory, a tag memory and a prefetch queue comparing circuit which includes a cache hit/miss judging circuit, an address queue register and a prefetch condition judging circuit, comprising the following steps:

(a) judging whether a currently-read address coming from the bus is of cache hit or cache miss by the cache hit/miss judging circuit, wherein the address consists of an index address and a tag address;

(b) directly storing the index address of the currently-read address plus a corresponding first one-bit flag signal output from the cache hit/miss judging circuit in the address queue register if the cache hit/miss judging circuit judges that the currently-read address is of cache hit, wherein the address queue register always continuously outputs index addresses already stored therein in first in-first out order to the data memory for data accesses;

(c) judging whether the index address of the currently-read address is the same as any index addresses already stored in the address queue register by the prefetch condition judging circuit if the cache hit/miss judging circuit judges that the currently-read address is of cache miss;

(d) replacing an original tag address stored at the same index address in the tag memory with the tag address of the currently-read address when the index address is not the same as any index addresses still stored in the address queue register;

(e) storing the index address plus a corresponding second one-bit flag signal output from the cache hit/miss judging circuit in the address queue register after step (d);

(f) replacing original data stored at the same index address in the data memory with required data stored at the same currently-read address in the primary memory after step (e); and (g) changing the second one-bit flag signal into the first one-bit flag signal after step (f).

5. The method as defined in claim 4, wherein the first one-bit flag signal is at a high logic level.

6. The method as defined in claimed 5, wherein the second one-bit flag signal is at a low logic level.

* * * * *